United States Patent
Iwamura et al.

(10) Patent No.: US 8,195,219 B2
(45) Date of Patent: Jun. 5, 2012

(54) USER APPARATUS AND METHOD IN MOBILE COMMUNICATION SYSTEM

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 354 days.

(21) Appl. No.: 12/672,016

(22) PCT Filed: Aug. 11, 2008

(86) PCT No.: PCT/JP2008/064427
§ 371 (c)(1),
(2), (4) Date: Feb. 3, 2010

(87) PCT Pub. No.: WO2009/022686
PCT Pub. Date: Feb. 19, 2009

(65) Prior Publication Data
US 2011/0117954 A1     May 19, 2011

(30) Foreign Application Priority Data
Aug. 13, 2007   (JP) .................. 2007-211095

(51) Int. Cl.
H04B 7/00       (2006.01)
H04W 4/00       (2009.01)

(52) U.S. Cl. ............... 455/525; 455/435.2; 455/437
(58) Field of Classification Search .......... 455/525, 455/524, 435.1, 435.2, 436, 440, 441, 445, 455/437; 370/331, 332, 252
See application file for complete search history.

(56) References Cited

U.S. PATENT DOCUMENTS 6,907,019 B2 *  6/2005  Kotzin et al. ............... 370/332
6,975,881 B2 * 12/2005  Sheynman et al. ....... 455/552.1
(Continued)

FOREIGN PATENT DOCUMENTS
JP     2004-159304 A    6/2004
(Continued)

OTHER PUBLICATIONS

International Search Report w/translation from PCT/JP2008/064427 dated Sep. 16, 2008 (4 pages).
(Continued)

Primary Examiner — Sonny Trinh
(74) Attorney, Agent, or Firm — Osha • Liang LLP

(57) ABSTRACT

A user apparatus for use in a mobile communication system includes a reception unit configured to receive a signal transmitted from a base station and obtain a parameter for determining evaluation criteria on cell reselection; a counting unit configured to count a number of cell reselections; and a measurement unit configured to measure a Doppler frequency indicative of a mobility of the user apparatus. The evaluation criteria on cell reselection are that reception signal strength of a signal transmitted from a target base station has been higher than or equal to reception signal strength of a signal transmitted from a source base station by greater than or equal to a hysteresis threshold for longer than or equal to a time to trigger. It is determined whether the evaluation criteria on cell reselection are modified and used depending on whether both first and second conditions are satisfied. The first condition is that a number of cell reselections being performed within a predefined first period (TCRmax) is greater than or equal to a predefined first threshold (NCR or NCR2). The second condition is that the Doppler frequency has been higher than or equal to a predefined second threshold ($FD_{thresh}$ or $FD_{thresh2}$) for a predefined second period (TFD). Modification of the evaluation criteria on cell reselection comprises at least modification of the time to trigger.

17 Claims, 10 Drawing Sheets

U.S. PATENT DOCUMENTS

| | | | |
|---|---|---|---|
| 7,689,221 B1 * | 3/2010 | Gazzard | 455/437 |
| 7,898,997 B2 * | 3/2011 | Lee et al. | 370/311 |
| 7,949,337 B2 * | 5/2011 | Choi | 455/440 |
| 2005/0164706 A1 | 7/2005 | Wakabayashi | |
| 2008/0225801 A1 * | 9/2008 | Turk | 370/332 |
| 2009/0137246 A1 * | 5/2009 | Xing et al. | 455/434 |
| 2009/0291688 A1 * | 11/2009 | Uehara et al. | 455/436 |
| 2009/0303891 A1 * | 12/2009 | Lucas et al. | 370/252 |
| 2010/0093350 A1 * | 4/2010 | Wang et al. | 455/436 |
| 2010/0279638 A1 * | 11/2010 | Lindoff | 455/226.1 |

FOREIGN PATENT DOCUMENTS

| | | |
|---|---|---|
| JP | 2005-020458 A | 1/2005 |
| JP | 2006-512874 A | 4/2006 |
| JP | 2007-116282 A | 5/2007 |
| JP | 2007-53437 A | 8/2008 |
| WO | 03/105518 A1 | 12/2003 |
| WO | 2005/011176 A3 | 2/2005 |

OTHER PUBLICATIONS

Written Opinion from PCT/JP2008/064427 dated Sep. 16, 2008 (4 pages).

3GPP TS 25.331 V7.5.0; "Protocol Specification"; Jun. 2007 (1429 pages).

3GPP TS 25.304 V7.2.0; "User Equipment (UE) procedures in idle mode and procedures for cell reselection in connected mode"; Jun. 2007 (41 pages).

Japanese Office Action for Application No. 2007-211095, mailed on Nov. 22, 2011 (6 pages).

Patent Abstracts of Japan for Japanese Publication No. 2005-020458, publication date Jan. 20, 2005 (1 page).

* cited by examiner

FIG.2
(CASE 1)
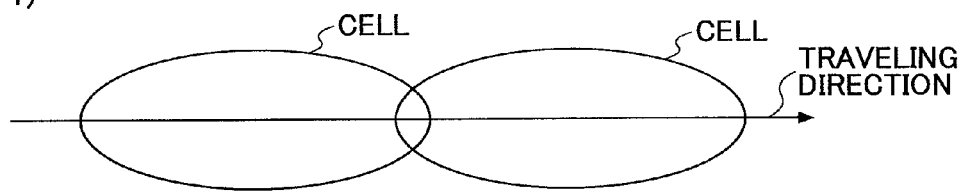
(CASE 2)
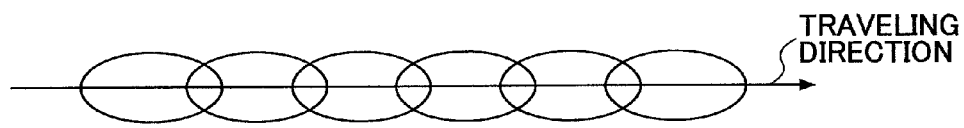
FIG.3
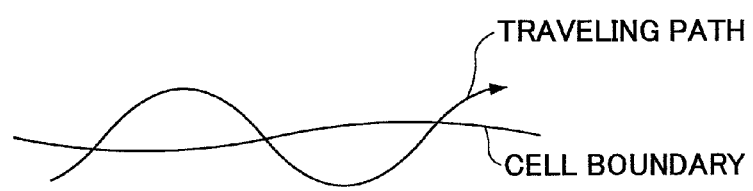
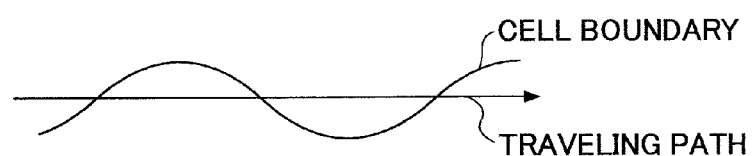

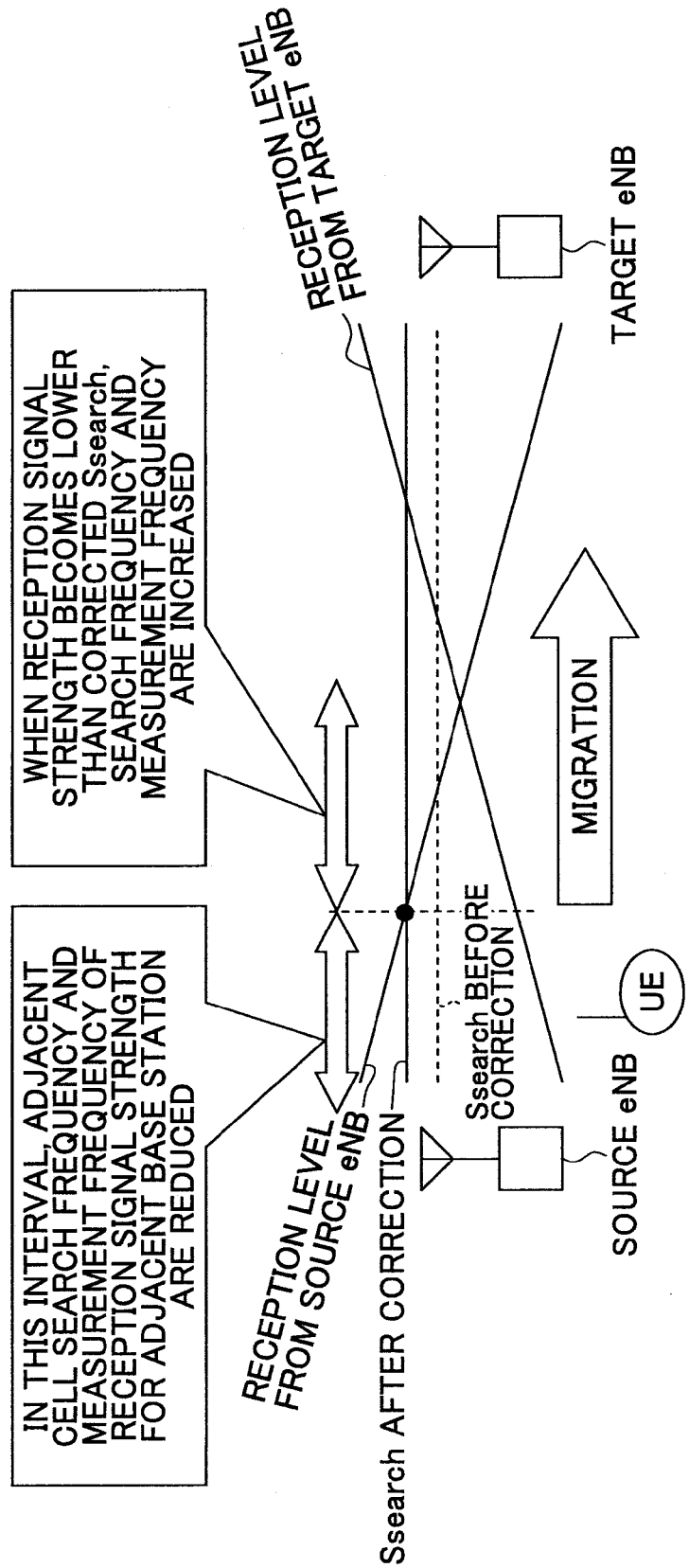

FIG.10

| VELOCITY | RECEPTION SIGNAL STRENGTH FOR SERVING BASE STATION ≥ Ssearch | RECEPTION SIGNAL STRENGTH FOR SERVING BASE STATION < Ssearch |
|---|---|---|
| LOW | SEARCH FREQUENCY/ MEASUREMENT FREQUENCY N1 | SEARCH FREQUENCY/ MEASUREMENT FREQUENCY N2 ( > N1) |
| MEDIUM | SEARCH FREQUENCY/ MEASUREMENT FREQUENCY N3 | SEARCH FREQUENCY/ MEASUREMENT FREQUENCY N4 ( > N3 AND > N2) |
| HIGH | SEARCH FREQUENCY/ MEASUREMENT FREQUENCY N5 | SEARCH FREQUENCY/ MEASUREMENT FREQUENCY N6 ( > N5 AND > N4) |

| # | INFORMATION ITEM (SUFFIXES 1, 2, 3 CORRESPOND TO LOW, MEDIUM AND HIGH IN VELOCITY RANGES) | TYPE | DESCRIPTION |
|---|---|---|---|
| 1 | TCRmax | Enumerated (not used, 30, 60, 120, 180, 240) [s] | IN CASE OF "NOT USED", NO CORRECTION IS MADE BASED ON THE NUMBER OF CELL CROSSING TIMES |
| 2 | NCR1, NCR2 | Integer (1..16) | IN CASE OF "TCRmax = NOT USED", UNNECESSARY |
| 3 | FDthresh1, FDthresh2 | Enumerated (5, 25, 50, 75, 100, 150, 200, 300) [Hz] | FDthresh2 MAY BE SPECIFIED AS RELATIVE VALUES TO FDthresh1 SUCH AS 0.1, 0.2, ... |
| 4 | TFD | Enumerated (not used, 30, 60, 120, 180, 240) [s] | IN CASE OF "NOT USED", NO CORRECTION IS MADE BASED ON DOPPLER FREQUENCY |
| 5 | TCRmaxHyst1, TCRmaxHyst2 | Enumerated (not used, 10, 20, 30, 40, 50, 60, 70) [s] | IN CASE OF "NOT USED", NO HYSTERESIS |
| 6 | Treselection1, Treselection2, Treselection3 | Integer (0..31) [s] | Treselection2 AND Treselection3 MAY BE SPECIFIED AS RELATIVE VALUES TO Treselection1 SUCH AS 0.1, 0.2, ... |
| 7 | Qhyst1, Qhyst2, Qhyst3 | Integer (0..40 by step of 2) [dB] | Qhyst2 AND Qhyst2 MAY BE SPECIFIED AS RELATIVE VALUES TO Qhyst1 SUCH AS 0.1, 0.2, ... |
| 8 | Ssearch1, Ssearch2, Ssearch3 | Integer (−32..20 by step of 2) [dB] | |
| 9 | Tmeas1a, Tmeas2a, Tmeas3a | Enumerated (no measurement, 20, 50, 100, 200, 300, ...) [ms] | ADJACENT CELL MEASUREMENT PERIOD FOR CASE OF OWN CELL RECEPTION SIGNAL STRENGTH ≥ Ssearch IN CASE OF NO MEASUREMENT, NO MEASUREMENT IS MADE Tmeas2a AND Tmeas3a MAY BE SPECIFIED AS RELATIVE VALUES TO Tmeas1 SUCH AS 0.1, 0.2, ... |
| 10 | Tmeas1b, Tmeas2b, Tmeas3b | Enumerated (no measurement, 20, 50, 100, 200, 300, ...) [ms] | ADJACENT CELL MEASUREMENT PERIOD FOR CASE OF OWN CELL RECEPTION SIGNAL STRENGTH < Ssearch IN CASE OF NO MEASUREMENT, NO MEASUREMENT IS MADE Tmeas2b AND Tmeas3b MAY BE SPECIFIED AS RELATIVE VALUES TO Tmeas1b SUCH AS 0.1, 0.2, ... |
| 11 | Tsearch1a, Tsearch2a, Tsearch3a | Enumerated (no search, 320, 640, 1280, 2560, 5120, 10240) [ms] | ADJACENT CELL SEARCH PERIOD FOR CASE OF OWN CELL RECEPTION SIGNAL STRENGTH ≥ Ssearch IN CASE OF NO SEARCH, NO SEARCH IS MADE Tsearch2a AND Tsearch3a MAY BE SPECIFIED AS RELATIVE VALUES TO Tsearch1a SUCH AS 0.1, 0.2, ... |
| 12 | Tsearch1b, Tsearch2b, Tsearch3b | Enumerated (no search, 320, 640, 1280, 2560, 5120, 10240) [ms] | ADJACENT CELL SEARCH PERIOD FOR CASE OF OWN CELL RECEPTION SIGNAL STRENGTH < Ssearch IN CASE OF NO SEARCH, NO SEARCH IS MADE Tsearch2b AND Tsearch3b MAY BE SPECIFIED AS RELATIVE VALUES TO Tsearch1b SUCH AS 0.1, 0.2, ... |

USER APPARATUS AND METHOD IN MOBILE COMMUNICATION SYSTEM

TECHNICAL FIELD

The present invention generally relates to the technical field of mobile communication, and more particularly relates to a user apparatus and a method for cell reselection.

BACKGROUND ART

In a cellular mobile communication system, handover between cells enables mobile communications across whole service areas. The handover may be also referred to as cell reselection. In some cases, cell transition during communication may be referred to as handover while cell transition during standby may be referred to as cell reselection, but these different types of transition are referred to as cell reselection without distinction herein. Theoretically, a time point or a location point when/where a connecting or waiting cell for a user apparatus should be switched corresponds to a point when/where a magnitude relationship is reversed between reception signal strength of signals transmitted from a source base station (source eNB) and reception signal strength of signals transmitted from a target base station (target eNB). Meanwhile, the cell reselection imposes a high signal processing workload on both a system and a user apparatus and accordingly should not be conducted excessively. For example, in the handover during communication, processing workload may arise such as path switching or context transferring between network nodes for user apparatuses. Also, in the cell reselection during standby, processing workload on a user apparatus for receiving broadcast information at a target cell may arise, which may influence battery energy consumption. For these reasons, the cell reselection is commonly initiated in consideration of some hysteresis.

FIG. 1 illustrates an exemplary correlation of reception signal power and hysteresis. In the illustration, the cell reselection is initiated after a state of the reception signal strength of signals transmitted from a target eNB being higher than the reception signal strength of signals transmitted from a source eNB by greater than or equal to a hysteresis threshold $Q_{hyst}$ has been maintained for a time period longer than or equal to a "time to trigger" T (second). The hysteresis threshold and the time to trigger are transmitted to a user apparatus in broadcast information BCH. In this manner, unnecessary cell reselection can be reduced near cell boundaries. Thus, it is preferred that the time to trigger be made longer to perform only truly necessary cell reselection.

Meanwhile, cells are variously arranged and users are traveling in various directions in a mobile communication system. For example, Case 1 in FIG. 2 schematically illustrates that a user is passing through several cells having a relatively large size at a certain velocity v. Case 2 schematically illustrates that a user is passing through several cells having a relatively small size at the same velocity v. In Case 2, since the cell reselection should be performed frequently, it is preferred that the time to trigger be set to be shorter. In Case 1, on the other hand, the cell reselection does not have to be performed so frequently. Rather, if the time to trigger is made shorter in Case 1, there is a risk that unnecessary cell reselections may be performed. In conjunction with this point, the time to trigger $T_{reselection}$ is set to be shorter in a UMTS (Universal Mobile Telecommunication System) if the number of cell reselections performed previously by a user apparatus is greater than a predefined value. Adjustment of $T_{reselection}$ in UMTSs is disclosed in 3GPP TS25.331 V7.5.0 and 3GPP TS25.304 V7.2.0, for example. Particularly, parameters are disclosed in TS25.331, 10.3.2.3.

DISCLOSURE OF INVENTION

Problem to be Solved by the Invention

As stated above, in a mobile communication system, cells are variously arranged and users are traveling in various directions. In addition to the situations illustrated in FIG. 2, as illustrated in FIG. 3, there are other cases where a user is snaking his/her way (upper illustration) and cells have intricate boundaries (lower illustration). It is likely that these situations may increase in the future. In the cases as illustrated in FIG. 3, the number of cell reselections would increase relatively. Thus, the time to trigger would be set to be shorter in accordance with the above scheme for the UMTS. In the cases as illustrated in FIG. 3, however, the user would not pass through a large number of cells at a high velocity, and thus unnecessary cell reselection should be reduced. Despite this, the time to trigger is set to be shorter, which may prompt the cell reselections and lead to frequent unnecessary cell reselections.

One object of the present invention is to enable a user apparatus to determine correctly whether evaluation criteria on the cell reselection being broadcast in resident cells are to be modified and applied to the user apparatus.

Means for Solving the Problem

One aspect of the present invention relates to a user apparatus for use in a mobile communication system, including: a reception unit configured to receive a signal transmitted from a base station and obtain a parameter for determining evaluation criteria on cell reselection; a counting unit configured to count a number of cell reselections; and a measurement unit configured to measure a Doppler frequency indicative of a mobility of the user apparatus, wherein the evaluation criteria on cell reselection are that reception signal strength of a signal transmitted from a target base station has been higher than or equal to reception signal strength of a signal transmitted from a source base station by greater than or equal to a hysteresis threshold for longer than or equal to a "time to trigger" or reselection standby period, it is determined whether the evaluation criteria on cell reselection are modified and used depending on whether both first and second conditions are satisfied, the first condition is that a number of cell reselections being performed within a predefined first period (TCRmax) is greater than or equal to a predefined first threshold (NCR or NCR2), the second condition is that the Doppler frequency has been higher than or equal to a predefined second threshold ($FD_{thresh}$ or $FD_{thresh2}$) for a predefined second period (TFD), and modification of the evaluation criteria on cell reselection comprises at least modification of the time to trigger.

Advantage of the Invention

According to the present invention, it is possible to determine correctly whether evaluation criteria on the cell reselection being broadcast in resident cells are to be modified and applied to the user apparatus.

BRIEF DESCRIPTION OF DRAWINGS

FIG. 2 schematically illustrates cases where cell reselections are to be frequently and infrequently performed;

FIG. 3 schematically illustrates exemplary situations where the cell reselections are performed many times;

FIG. 9 is a second diagram illustrating the third embodiment;

FIG. 10 schematically illustrates exemplary settings of cell search or quality measurement frequency depending on migration velocity; and FIG. 11 illustrates exemplary parameters transmitted from a base station apparatus to a user apparatus.

LIST OF REFERENCE SYMBOLS

Figure 1:
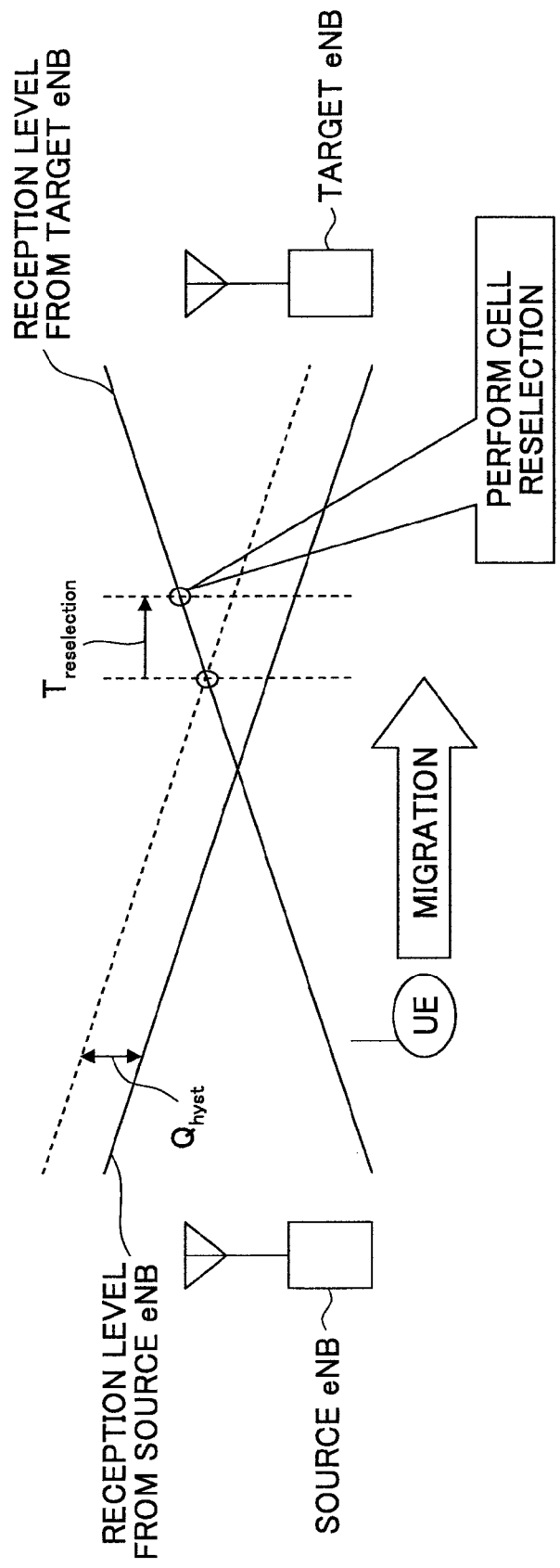
FIG. 1 schematically illustrates exemplary correlation of reception signal power and hysteresis.

61: RF unit
62: L1/L2 processing unit
63: RRC processing unit
64: Doppler frequency measurement unit
65: reselection counter unit
66: velocity determination unit

BEST MODE FOR CARRYING OUT THE INVENTION

According to one aspect of the present invention, it is determined whether to modify and use evaluation criteria on cell reselection by determining whether both the first condition and the second condition are satisfied at a user apparatus. The first condition is that the number of cell reselections being performed in a predefined first period (TCRmax) is greater than or equal to a predefined first threshold (NCR or NCR2). The second condition is that Doppler frequency is higher than or equal to a predefined second threshold ($FD_{thresh}$ or $FD_{thresh2}$) over a predefined second period (TFD). The evaluation criteria on the cell reselection are that reception signal strength of signals transmitted from a target base station has been higher than reception signal strength of signals transmitted from a source base station by higher than or equal to a hysteresis threshold for longer than or equal to a time to trigger. The reception signal strength may be reception power of pilot signals or reception signal to interference power ratio, for example. The shortened time to trigger is not used if only the first condition is satisfied. The second condition as well as the first condition must be satisfied. In the situation as illustrated in FIG. 3, the first condition may be satisfied, but the second condition may not be satisfied in many cases. Thus, the time to trigger $T_{reselection}$ may not be shortened excessively. As a result, it can be determined at a user apparatus whether to modify the evaluation criteria on the cell reselection and apply it to the user apparatus.

In order to differentiate more than two velocity states, additional conditions may be provided for different modification methods for the evaluation criteria on the cell reselection through determination as to whether both the third and fourth conditions are satisfied. The third condition is that the number of cell reselections being performed in a predefined third period (TCRmax) is greater than or equal to a predefined third threshold (NCR1). The fourth condition is that Doppler frequency has been higher than or equal to a predefined fourth threshold ($FD_{thresh1}$) for a predefined fourth period (TFD). The time to trigger may be set to be shorter in the case of both the third and fourth conditions being satisfied than in the case where both the third and fourth conditions are not satisfied.

In order to provide various modification methods for the evaluation criteria on the cell reselection, not only the time to trigger $T_{reselection}$ but also the hysteresis threshold $Q_{hyst}$ may be modified.

The time to trigger $T_{reselection}$ may be referred to as Time to Trigger, and the hysteresis threshold $Q_{hyst}$ may be referred to as Reporting Range. Also, if the evaluation criteria on the cell reselection (handover during communications) are satisfied, measurement reports may be transmitted from a user apparatus to a communicating base station.

In one embodiment of the present invention, it is determined whether to modify and use a frequency of adjacent cell search or a measurement frequency of reception signal strength at adjacent base stations by determining whether both the first and second conditions are satisfied at a user apparatus. The user apparatus periodically performs the adjacent cell search and measures reception signal strength for the adjacent base stations for standby/communication at more suitable base stations. From the viewpoint of battery energy savings, while the reception signal strength for a currently serving base station (base station where the user apparatus is waiting or communicating) is higher than or equal to a certain threshold Ssearch, the cell reselection may not be required so much (lower likelihood that a more suitable base station may be detected). Thus, the frequency of adjacent cell search or the measurement frequency of the reception signal strength at adjacent base stations may be reduced. In one embodiment of the present invention, if the first and second conditions are satisfied, the threshold Ssearch is modified. The threshold Ssearch may be set to be larger in the case where both the first and second conditions are satisfied than the case where both the first and second conditions are not satisfied.

From the viewpoint of battery energy savings for a user apparatus, not only the threshold Ssearch but also the frequency of adjacent cell search or the measurement frequency of reception signal strength at adjacent base stations may be modified.

In order to make velocity determination more stable, the Doppler frequency to be compared with thresholds may be an average over instantaneous Doppler frequencies.

First Embodiment

Figure 4:
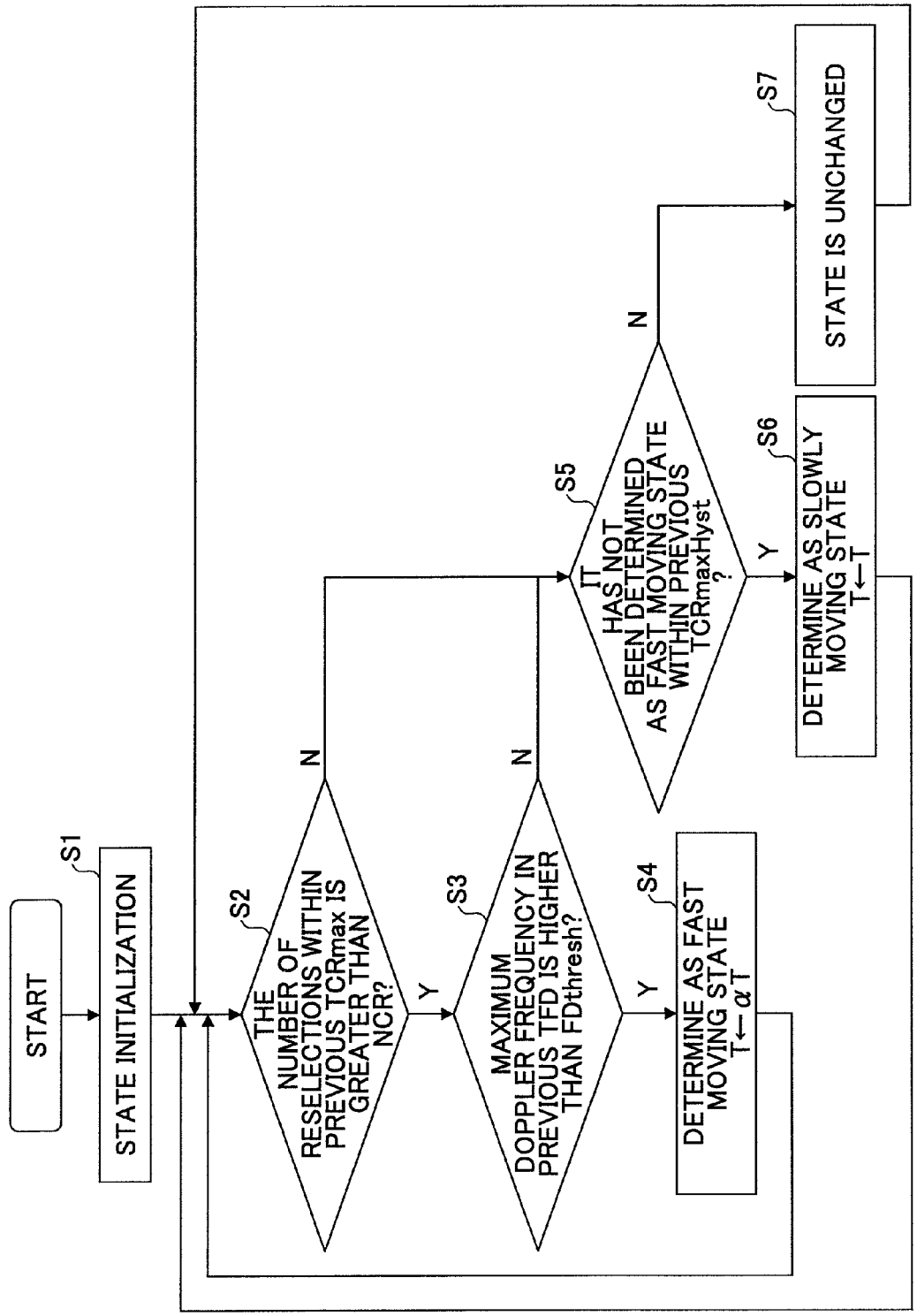
FIG. 4 is a flowchart illustrating an exemplary operation according to a first embodiment.

FIG. 4 is a flowchart illustrating an exemplary operation according to the first embodiment. The illustrated flow is performed in a user apparatus for use in a mobile communication system. The flow starts with step S1 for state initialization. Before proceeding to subsequent steps, the user apparatus at least receives broadcast information BCH from a base station apparatus (serving base station or source base station) for a resident cell and obtains parameters for determining evaluation criteria on cell reselection. Specifically, the parameters may include a hysteresis threshold $Q_{hyst}$, a time to trigger $T_{reselection}$, a cell selection counting period TCRmax, a cell selection counter threshold NCR, a mobility monitoring period TFD, a Doppler frequency threshold $FD_{thresh}$ and other parameters.

At step S2, it is determined how many times cell reselection has been performed for the cell selection counting period TCRmax before the present time. In other words, it is determined how many times the user apparatus has performed the cell reselection for the cell selection counting period TCRmax before the present time. The cell selection counting period TCRmax may be set to 30, 60, 120, 180 and 240 seconds but is not limited to them. The cell selection counting period TCRmax may be set to any other appropriate value. The determined cell selection count value is compared with the cell selection counter threshold for magnitude comparison. The cell selection counter threshold NCR may be set to any integer value between 1 and 16, for example. However, the cell selection counter threshold NCR is not limited to it and may be set to any other appropriate values. If the determined cell selection count value is greater than the cell selection counter threshold NCR, the flow proceeds to step S3.

At step S3, it is determined whether the maximum Doppler frequency has been higher than or equal to the Doppler frequency threshold $FD_{threshold}$ for the mobility monitoring period TFD The mobility monitoring period TFD may or may not be equal to the cell selection counting period TCRmax. Also, the TFD may be set to 0. In addition, steps S2 and S3 may be performed in the illustrated or different sequence. Also, all or some of the steps may be performed simultaneously. The maximum Doppler frequency to be compared with the Doppler frequency threshold $FD_{thresh}$ may be an instantaneous value or an average over several instantaneous values. If the maximum Doppler frequency has been higher than or equal to the threshold $FD_{thresh}$ for the previous TFD, the flow proceeds to step S4.

The flow would proceed to step S4 if it holds that the cell reselection count value is greater than or equal to the threshold NCR and that the maximum Doppler frequency is higher than or equal to the threshold $FD_{thresh}$. Thus, the user apparatus has experienced a larger number of cell reselections while migrating fast. This may correspond to the situation for Case 2 in FIG. 2. The user is migrating fast. Accordingly, at step S4, the default time to trigger $T_{reselection}$ as indicated in the broadcast information is multiplied with α (0<α<1), resulting in a time to trigger ($α×T_{reselection}$) smaller than the default value, which is used at the user apparatus. Then, the flow returns to step S2.

On the other hand, if the reselection count value is smaller than the threshold NCR at step S2 or if the maximum Doppler frequency is lower than the threshold $FD_{thresh}$ at step S3, the flow proceeds to step S5.

At step S5, it is determined whether the user apparatus has not been determined to be in fast migration state for a certain past period TCRmaxHys. In the case where the user apparatus is not determined to be in the fast migration state, the flow proceeds to step S6.

At step S6, it is determined that the user apparatus UE is in a slow migration state. This case may typically correspond to Case 1 in FIG. 2, and thus the time to trigger is used without modification. Then, the flow returns to step S2 where the above-mentioned operations are performed.

On the other hand, if the user apparatus is determined to be in the fast migration state at step S5, the flow proceeds to step S7 where the state currently set for the user apparatus remains. In other words, if the user apparatus is in the fast migration state, the modified time to trigger is subsequently used, and if the user apparatus is in the slow migration state, the unchanged time to trigger is subsequently used. Then, the flow returns to step S2 where the above-mentioned operations are performed.

Although step S5 is not essential, execution of step S5 leads to hysteresis in the velocity state determination for the user apparatus, which may be advantageous in terms of stable operations.

In the above illustration, if the user apparatus is in the fast migration state, the time to trigger $T_{reselection}$ is set to be shorter than the default value. In other embodiments, additionally or alternatively, the hysteresis threshold $Q_{hyst}$ may be modified. In other words, not only a shorter time to trigger $T_{reselection}$ but also a smaller hysteresis threshold $Q_{hyst}$ may be used from the viewpoint of promotion of the cell reselection. For example, the default value may be reduced from 5 dB to 3 dB. On the other hand, not only a longer time to trigger $T_{reselection}$ but also a greater hysteresis threshold $Q_{hyst}$ may be used from the viewpoint of reduction in the cell reselection.

Figure 5:
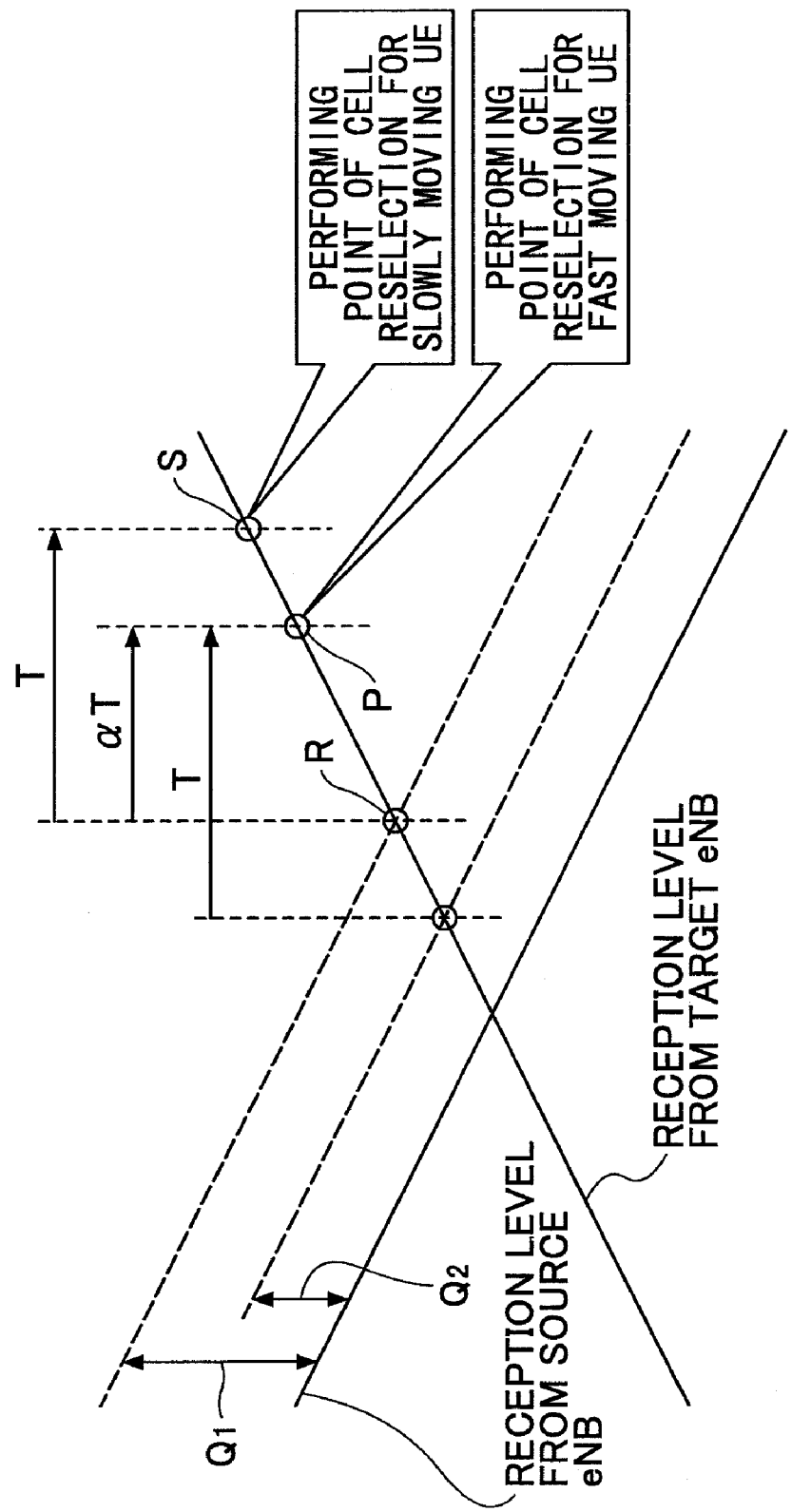
FIG. 5 schematically illustrates exemplary correlation of time to triggers and hysteresis thresholds.

FIG. 5 schematically illustrates exemplary correlation between the time to trigger $T_{reselection}$ (illustrated as an abbreviation "T") and the hysteresis threshold $Q_{hyst}$ (illustrated as abbreviations "$Q_1$ and $Q_2$"). As illustrated, the default time to trigger T is used for a slowly migrating user apparatus while the shorter time to trigger αT is used for a fast migrating user apparatus. More specifically, if the reception signal strength of signals transmitted from a target eNB has been higher than or equal to the reception signal strength of signals transmitted from a source eNB by greater than or equal to a first hysteresis threshold $Q_1$ for longer than or equal to the shorter time to trigger αT, the fast migrating user apparatus initiates cell reselection (at point P). The slowly migrating user apparatus initiates the cell reselection at point S. The hysteresis threshold is correlated with the time to trigger. Thus, even if the time to trigger T is not shortened and instead the hysteresis threshold is changed into $Q_2$, the cell reselection could be performed at the same point P. If only the time to trigger T can be changed, the cell reselection cannot be performed before point R. However, if the hysteresis threshold is adjusted, the cell reselection can be performed before point R. For example, if the user apparatus is fast migrating in a Shinkansen train, the reselection toward a target cell can be advantageously performed earlier. In this manner, variability of the time to trigger as well as the hysteresis threshold allows a user apparatus to set evaluation criteria on the cell selection more suitably for migration states and/or performance of the user apparatus.

Figure 6:
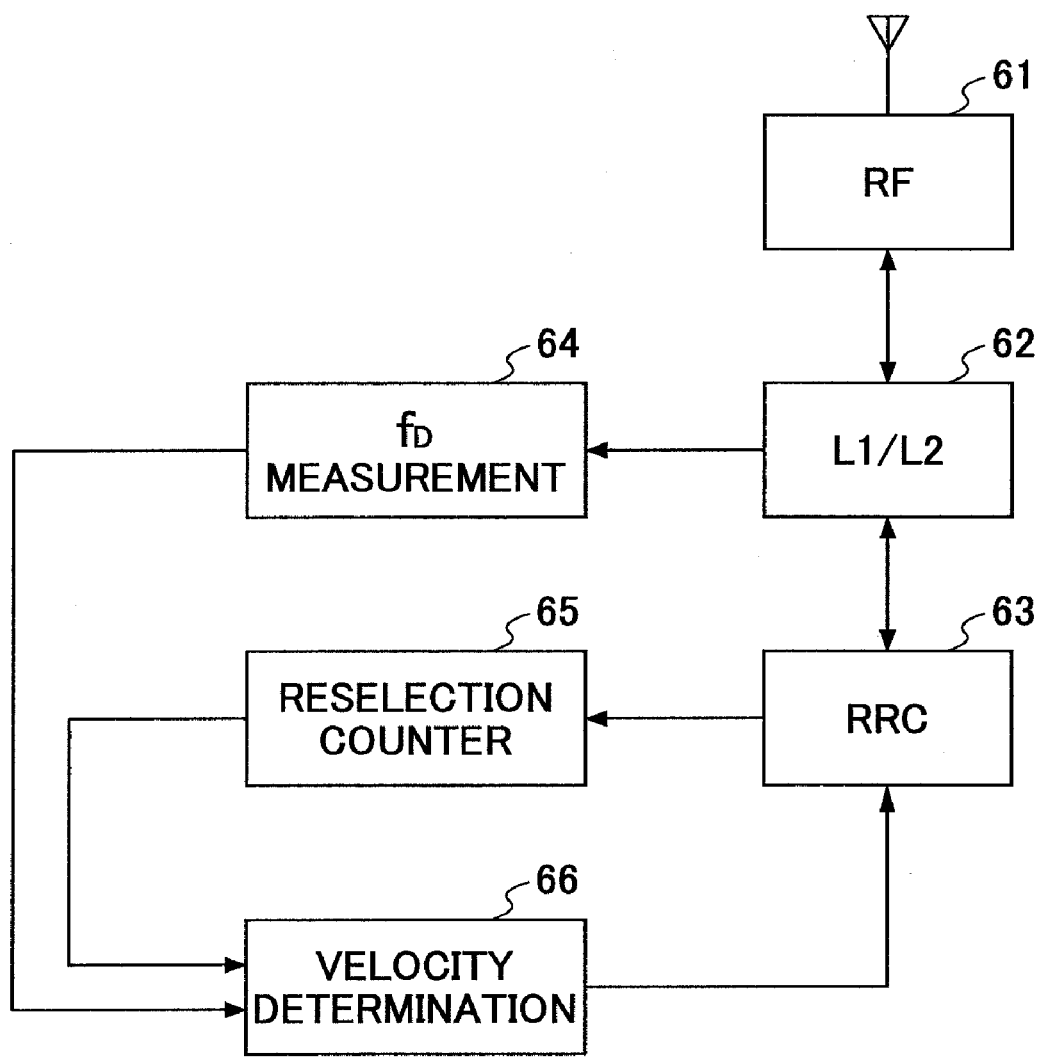
FIG. 6 is a functional block diagram illustrating a user apparatus.

FIG. 6 is a functional block diagram illustrating a user apparatus. In FIG. 6, a RF unit 61, a L1/L2 processing unit 62, a RRC processing unit 63, a Doppler frequency measurement unit 64, a reselection counter unit 65 and a velocity determination unit 66 are illustrated.

The RF unit 61 performs signal transformation between signals communicated over the air via an antenna and baseband signals used in the user apparatus.

The L1/L2 processing unit 62 performs signal processing on a physical layer L1 and a MAC layer L2.

The RRC processing unit 63 performs signal processing on a RRC protocol layer. In this embodiment, the RRC processing unit 63 particularly performs operations for cell reselection such as reception of broadcast information in a target cell.

The Doppler frequency measurement unit 64 measures the maximum Doppler frequency for the user apparatus. The measured Doppler frequency $f_D$ is reported to the velocity determination unit 66. The measured value may be used at step S3 in FIG. 4.

The reselection counter unit 65 counts the number of cell reselections. The counted value is also reported to the velocity determination unit 66. The count value may be used at step S2 in FIG. 4.

Figure 7:
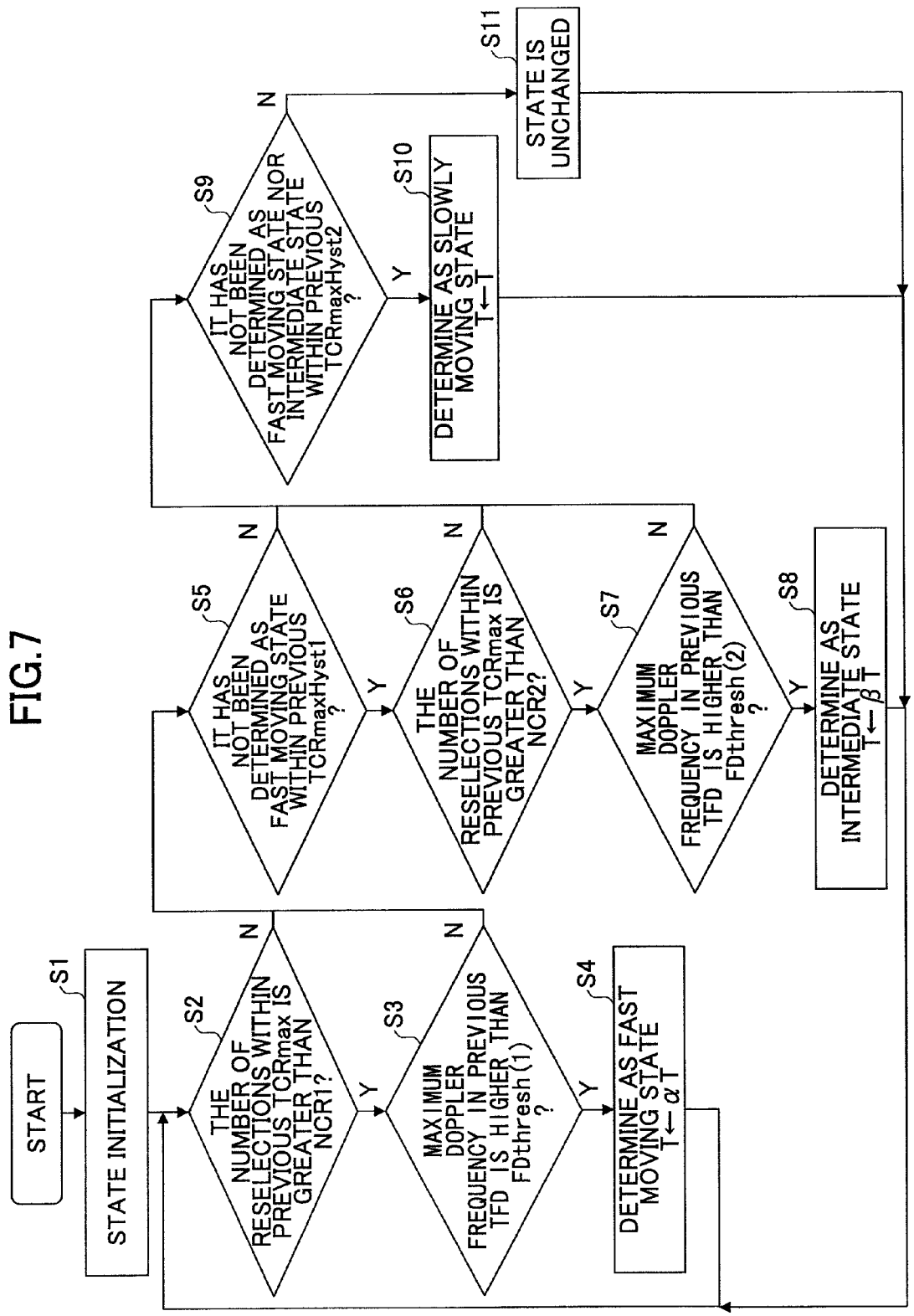
FIG. 7 is a flowchart illustrating an exemplary operation according to a second embodiment.

The velocity determination unit 66 determines whether the user apparatus is migrating fast (fast migration state) or the user apparatus stays or is migrating slowly (slow migration state). The determination may be made in accordance with procedures as stated in FIG. 4 or as illustrated in FIG. 7 below. Depending on the determination, the RRC processing unit 63 performs the cell reselection for the user apparatus under modified or unmodified evaluation criteria on the cell selection.

Second Embodiment

FIG. 7 is a flowchart illustrating an exemplary operation according to the second embodiment. In the first embodiment, a user apparatus has two migration states, and evaluation criteria on cell selection are set to be suitable for each of the migration states. In the second embodiment, a user apparatus has three migration states, and evaluation criteria on cell selection are set to be suitable for each of the migration states. For example, a fast migration state may be associated with about 100 km/h. For example, a medium migration state may be associated with about 50 km/h. Similarly, four or more migration states may be provided.

The flow starts with step S1 where state initialization is performed. A user apparatus receives broadcast information BCH from a base station apparatus for a resident cell and obtains parameters for determining evaluation criteria on cell reselection.

At step S2, it is determined how many times cell reselection has been performed for a cell selection counting period TCRmax before the present time. In other words, it is determined how many times the cell reselection has been performed for the TCRmax before the present time. The determined number of cell reselections is compared with a first cell selection counter threshold NCR1 for magnitude comparison. The first cell selection counter threshold NCR1 may be any integer between 1 and 16, for example, but is not limited to them. Any other appropriate value may be used. If the determined number of cell selections is greater than the first cell selection counter threshold NCR, the flow proceeds to step S3.

At step S3, it is determined whether the maximum Doppler frequency has been higher than or equal to a first Doppler frequency threshold $FD_{thresh(1)}$ for a mobility monitoring period TFD before the present time. The mobility monitoring period TFD may or may not be set to be equal to the cell selection counting period TCRmax. Alternatively, the TFD may be set to 0. In addition, steps S2 and S3 may be performed in the illustrated sequence or in the reversed sequence. All or some of the steps may be performed simultaneously. The maximum Doppler frequency to be compared with the first Doppler frequency threshold $FD_{thresh(1)}$ may be an instantaneous value or an average over multiple instantaneous values. If the maximum Doppler frequency has been higher than or equal to the threshold $FD_{thresh(1)}$ for the TFD before the present time, the flow proceeds to step S4.

The case where the flow proceeds to step S4 corresponds to the case where it holds that the number of cell reselections is greater than or equal to the threshold NCR1 and that the maximum Doppler frequency is higher than or equal to the threshold $FD_{thresh(1)}$. Thus, it can be concluded that the user apparatus has experienced a large number of cell reselections while traveling fast. This user apparatus could be in the fast migration state. At step S4, a default time to trigger $T_{reselection}$ is multiplied with $\alpha$ ($0<\alpha<1$) to derive a time to trigger ($\alpha \times T_{reselection}$) smaller than the default value, which is used in the user apparatus. Then, the flow returns to step S2.

On the other hand, if the number of cell reselections is smaller than the threshold NCR1 at step S2 or if the maximum Doppler frequency is lower than the threshold $FD_{thresh(1)}$ at step S3, the flow proceeds to step S5.

At step S5, it is determined whether the user apparatus has not been determined to be in the fast migration state for a previous certain period TCRmaxHys1. If the user apparatus has not been determined to be in the fast migration state, the flow proceeds to step S6.

At step S6, the number of cell reselections performed during the cell selection counting period TCRmax before the present time is compared with a second cell selection counter threshold NCR2 for magnitude comparison. The second cell selection counter threshold NCR2 may be any integer between 1 and 16, for example, but may be any other appropriate value. Typically, the second cell selection counter threshold NCR2 may be set to be smaller than the first cell selection counter threshold NCR1. If the number of cell selections is greater than the second cell selection counter threshold NCR2, the flow proceeds to step S7.

At step S7, it is determined whether the maximum Doppler frequency has been higher than or equal to a second Doppler frequency threshold $FD_{thresh(2)}$ for a mobility monitoring period TFD before the present time. The second Doppler frequency threshold $FD_{thresh(2)}$ may be any appropriate value but typically may be set to a value corresponding to a mobility smaller than the first Doppler frequency threshold $FD_{thresh(1)}$. The mobility monitoring period TFD may or may not be set to be equal to the cell selection counting period TCRmax. In addition, steps S6 and S7 may be performed in the illustrated sequence or in the reversed sequence. All or some of the steps may be performed simultaneously. The maximum Doppler frequency to be compared with the second Doppler frequency threshold $FD_{thresh(2)}$ may be an instantaneous value or an average over multiple instantaneous values. If the maximum Doppler frequency has been higher than or equal to the threshold $FD_{thresh(2)}$ for the TFD before the present time, the flow proceeds to step S8.

The case where the flow proceeds to step S8 corresponds to the case where although the user apparatus is not in the fast migration state, it holds that the number of cell reselections is greater than or equal to the threshold NCR2 and that the maximum Doppler frequency is higher than or equal to the threshold $FD_{thresh(2)}$, so that it can be concluded that the user apparatus has a relatively large mobility. In other words, the user apparatus could be in the medium migration state. At step S8, a default time to trigger $T_{reselection}$ is multiplied with $\beta$ ($0<\alpha<\beta<1$) to derive a time to trigger ($\beta \times T_{reselection}$) smaller than the default value, which is used in the user apparatus. Then, the flow returns to step S2.

On the other hand, if it is determined that the user apparatus has been in the fast migration state before at step S5, if the number of cell reselections is smaller than the threshold NCR2 at step S6 or if the maximum Doppler frequency is lower than the threshold $FD_{thresh(2)}$ at step S7, the flow proceeds to step S9.

At step S9, it is determined that the user apparatus is not determined to be in the fast migration state nor in the medium migration state during a previous period TCRmaxHys2. If the user apparatus is not determined to be in the fast migration state nor the medium state, the flow proceeds to step S10.

At step S10, it is determined that the user apparatus UE is in the slow migration state. This case may typically correspond to the situation as illustrated in Case 1 in FIG. 2, and thus the time to trigger is used without modification. Then, the flow returns to step S2 where the above-mentioned operations are performed.

If the user apparatus is determined to be in the fast migration state or the medium migration state before at step S5, the flow proceeds to step S11 where the current state of the user apparatus is maintained. Specifically, if the user apparatus is in the fast migration state, the modified time to trigger $\alpha T$ is continuously used. If the user apparatus is in the medium migration state, the modified time to trigger βT is continuously used. If the user apparatus is in the slow migration state, the unmodified time to trigger is continuously used. Then, the flow returns to step S2 where the above-mentioned operations are performed.

Although steps S5 and S9 are not essential, execution of steps S5 and S9 can introduce hysteresis in the velocity state determination for the user apparatus, which may be advantageous from the viewpoint of stable operations.

Similar to the first embodiment, the cell reselection evaluation criteria may be set by adjusting one or both of the time to trigger and the hysteresis threshold.

FIG. 7 illustrates that step S1 is followed by step S2, but the operation sequence is not essential. For example, step S1 may be followed by step S5. In this embodiment, the velocity state of the user apparatus is determined in the order of the fast migration state, the medium migration state and the slow migration state, but this determination order is not essential. The velocity state may be initially determined from the slow migration state.

Third Embodiment

Figure 8:
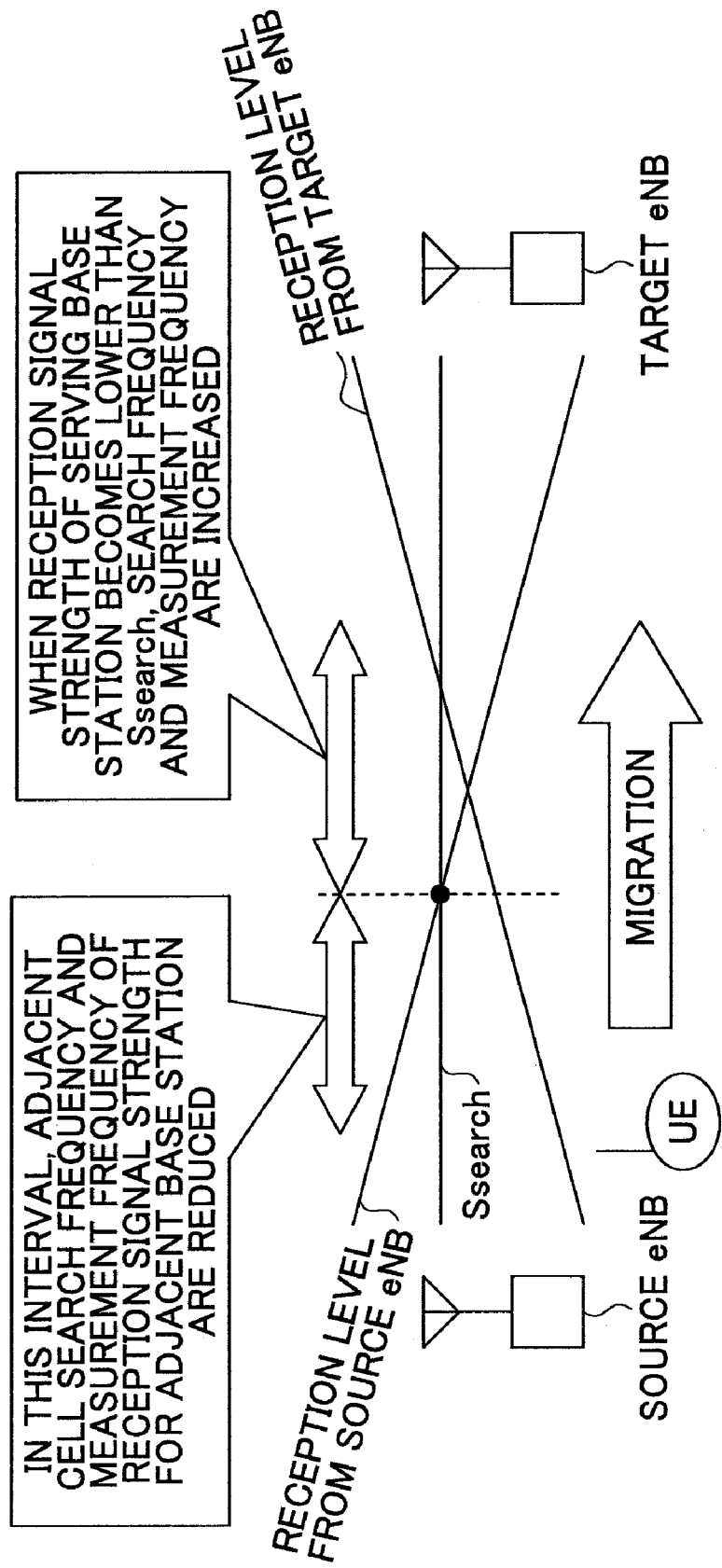
FIG. 8 is a first diagram illustrating a third embodiment.

In the third embodiment of the present invention, it is determined whether to modify and use frequency of adjacent cell search and measurement frequency of reception signal strength for adjacent base stations depending on whether the first and second conditions are satisfied at a user apparatus. The first and second conditions correspond to the conditions as determined at steps S2 and S3 in FIG. 4. For standby or communication at a more suitable base station, the user apparatus performs adjacent cell search periodically and measures reception signal strength for adjacent base stations. From the viewpoint of battery energy savings, when the reception signal strength for a currently serving base station (waiting base station or communicating base station) is higher than or equal to a threshold Ssearch, cell reselection might be less necessary (lower likelihood of detection of such a more suitable base station). Thus, while the reception signal strength for the currently serving base station is higher than or equal to the threshold Ssearch, the adjacent cell search may not have to be frequently performed, and the reception signal strength for adjacent base stations may not have to be frequently measured. FIG. 8 schematically illustrates exemplary variations of the cell search frequency depending on the reception signal quality in a serving cell.

As illustrated in FIG. 9, according to the third embodiment of the present invention, if the first and second conditions are satisfied, the threshold Ssearch is modified. The threshold Ssearch corresponding to the case where both the first and second conditions are satisfied may be set to be greater than that corresponding to the case where both the first and second conditions are not satisfied. As a result, if both the first and second conditions are satisfied, the cell search is more frequently performed, which may facilitate faster detection of cell reselection and handover events. Similarly, the threshold Ssearch corresponding to the case where both the third and fourth conditions are satisfied may be set to be greater than that corresponding to the case where both the third and fourth conditions are not satisfied. The third and fourth conditions correspond to the conditions as determined at steps S2 and S3 in FIG. 7. From the viewpoint of battery energy savings for a user apparatus, in addition to the modification of the threshold Ssearch, the adjacent cell search frequency or the measurement frequency of reception signal strength for adjacent base stations may be modified.

FIG. 10 illustrates various patterns of the cell search frequency or the signal strength measurement frequency depending on different migration velocities (fast, medium and slow) of a user apparatus. In the illustration, as described in conjunction with FIG. 9, different cell search frequencies or others are used depending on whether the reception signal strength for a serving cell is higher than or equal to a certain threshold Ssearch. In the illustrated example, the cell search frequency can be changed in a range between the minimum frequency N1 and the maximum frequency N6. As a result, the cell search or others can be performed with an appropriate frequency depending on the migration velocity of the user apparatus and the reception signal quality.

In this embodiment, a parameter for specifying the cell search frequency from N1 to N6 and the Ssearch values for use in velocity ranges such as fast, medium and slow velocities are broadcast or transmitted in a dedicated control channel from a base station apparatus to a communicating user apparatus. Similarly, the parameters such as TCRmax, TCRmaxHyst, NCR, TFD, $FD_{thresh}$, $T_{reselection}$, $Q_{hysy}$, α and β are broadcast or transmitted in a dedicated control channel from a base station apparatus to a communicating user apparatus. FIG. 11 illustrates exemplary parameters particularly related to the present invention among the parameters transmitted from a base station apparatus to user apparatuses. These parameters for use in the user apparatuses are made controllable by a network side, which enables the network side to adjust operations of the user apparatuses. Particularly, the network side can adequately control the operations of the user apparatuses depending on various situations such as the cell radius, the number of adjacent cells, presence of an expressway and others.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-211095 filed on Aug. 13, 2007, the entire contents of which are hereby incorporated by reference.

The invention claimed is:

1. A user apparatus for use in a mobile communication system, comprising:
    a reception unit configured to receive a signal transmitted from a base station and obtain a parameter for determining evaluation criteria on cell reselection;
    a counting unit configured to count a number of cell reselections; and
    a measurement unit configured to measure a Doppler frequency indicative of a mobility of the user apparatus, wherein
    the evaluation criteria on cell reselection are that reception signal strength of a signal transmitted from a target base station has been higher than or equal to reception signal strength of a signal transmitted from a source base station by greater than or equal to a hysteresis threshold for longer than or equal to a time to trigger, it is determined whether the evaluation criteria on cell reselection are modified and used depending on whether both first and second conditions are satisfied, the first condition is that a number of cell reselections being performed within a predefined first period (TCRmax) is greater than or equal to a predefined first threshold (NCR or NCR2), the second condition is that the Doppler frequency has been higher than or equal to a predefined second threshold ($FD_{thresh}$ or $FD_{thresh2}$) for a predefined second period (TFD), and modification of the evaluation criteria on cell reselection comprises at least modification of the time to trigger.

2. The user apparatus as claimed in claim 1, wherein the evaluation criteria on cell reselection are differently modified depending on whether both third and fourth conditions are satisfied, the third condition is that a number of cell reselections being performed within a predefined third period (TCRmax) is greater than or equal to a predefined third threshold (NCR1), and the fourth condition is that the Doppler frequency has been higher than or equal to a predefined fourth threshold ($FD_{thresh1}$) for a predefined fourth period.

3. The user apparatus as claimed in claim 2 wherein the time to trigger corresponding to a case where both the third and fourth conditions are satisfied is set to be shorter than the time to trigger corresponding to a case where both the third and fourth conditions are not satisfied.

4. The user apparatus as claimed in claim 2, wherein one or more parameters for determining the third condition or the fourth condition are extracted from a broadcast channel or a dedicated control channel.

5. The user apparatus as claimed in claim 1, wherein the modification of the evaluation criteria on cell reselection comprises modification of the hysteresis threshold.

6. The user apparatus as claimed in claim 1, wherein the Doppler frequency to be compared with the threshold comprises an average over instantaneous Doppler frequencies.

7. The user apparatus as claimed in claim 1, wherein the parameter for determining the evaluation criteria on cell reselection is extracted from broadcast information.

8. The user apparatus as claimed in claim 1, wherein one or more parameters for determining the first condition, the second condition or the evaluation criteria on cell reselection are extracted from a broadcast channel or a dedicated control channel.

9. A method for use in a user apparatus in a mobile communication system, the method comprising:

receiving a signal transmitted from a base station and obtaining a parameter for determining evaluation criteria on cell reselection;

counting a number of cell reselections and measuring a Doppler frequency indicative of a mobility of the user apparatus; and determining the evaluation criteria on cell reselection for use in the user apparatus depending on the counted number of cell reselections and the measured Doppler frequency, wherein the evaluation criteria on cell reselection are that reception signal strength of a signal transmitted from a target base station has been higher than or equal to reception signal strength of a signal transmitted from a source base station by greater than or equal to a hysteresis threshold for longer than or equal to a time to trigger, it is determined whether the evaluation criteria on cell reselection are modified and used depending on whether both first and second conditions are satisfied, the first condition is that a number of cell reselections being performed within a predefined first period (TCRmax) is greater than or equal to a predefined first threshold (NCR or NCR2), the second condition is that the Doppler frequency has been higher than or equal to a predefined second threshold ($FD_{thresh}$ or $FD_{thresh2}$) for a predefined second period (TFD), and modification of the evaluation criteria on cell reselection comprises at least modification of the time to trigger.

10. The method as claimed in claim 9, wherein the evaluation criteria on cell reselection are differently modified depending on whether both third and fourth conditions are satisfied, the third condition is that a number of cell reselections being performed within a predefined third period (TCRmax) is greater than or equal to a predefined third threshold (NCR1), and the fourth condition is that the Doppler frequency has been higher than or equal to a predefined fourth threshold ($FD_{thresh1}$) for a predefined fourth period.

11. A user apparatus for use in a mobile communication system, comprising:

a signal quality measurement unit configured to measure signal quality of signals received from a resident cell and other cells;

a cell search unit configured to perform cell search depending on the measured signal quality;

a counting unit configured to count a number of cell reselections; and a Doppler frequency measurement unit configured to measure a Doppler frequency indicative of a mobility of the user apparatus, wherein measurement frequency for the measurement units or cell search frequency is modified depending on whether the signal quality of a signal received from the resident cell is better than a quality threshold, the quality threshold is modified depending on whether both first and second conditions are satisfied, the first condition is that a number of cell reselections being performed within a predefined first period (TCRmax) is greater than or equal to a predefined first threshold (NCR or NCR2), and the second condition is that the Doppler frequency has been higher than or equal to a predefined second threshold ($FD_{thresh}$ or $FD_{thresh2}$) for a predefined second period (TFD).

12. The user apparatus as claimed in claim 11, wherein the quality threshold corresponding to a case where the first and second conditions are satisfied is set to be greater than the quality threshold corresponding to a case where the first and second conditions are not satisfied.

13. The user apparatus as claimed in claim 11, wherein if the first and second conditions are satisfied, the measurement frequency for the measurement units or the cell search frequency is increased.

14. The user apparatus as claimed in claim 11, wherein the quality threshold is modified depending on whether both third and fourth conditions are satisfied, the third condition is that a number of cell reselections being performed within a predefined third period (TCRmax) is greater than or equal to a predefined third threshold (NCR1), and the fourth condition is that the Doppler frequency has been higher than or equal to a predefined fourth threshold ($FD_{thresh}$) for a predefined fourth period (TFD).

15. The user apparatus as claimed in claim 14, wherein one or more parameters for determining the third condition or the fourth condition are extracted from a broadcast channel or a dedicated control channel.

16. The user apparatus as claimed in claim 11, wherein one or more parameters for determining the first condition, the second condition, the quality threshold, the measurement frequency or the cell search frequency are extracted from a broadcast channel or a dedicated control channel.

17. A method for use in a user apparatus in a mobile communication system, the method comprising:
  measuring signal quality of signals received from a resident cell and other cells;
  measuring a number of cell reselections and a Doppler frequency indicative of a mobility of the user apparatus; and
  performing cell search depending on the measured number of cell reselections and Doppler frequency, wherein
  measurement frequency or cell search frequency is modified depending on whether the signal quality of a signal received from the resident cell is better than a quality threshold,
  the quality threshold is modified depending on whether both first and second conditions are satisfied,
  the first condition is that a number of cell reselections being performed within a predefined first period (TCRmax) is greater than or equal to a predefined first threshold (NCR or NCR2), and
  the second condition is that the Doppler frequency has been higher than or equal to a predefined second threshold ($FD_{thresh}$ or $FD_{thresh2}$) for a predefined second period (TFD).

* * * * *